I. C. Spear.
Horse Hay-Fork.
Nº 73403      Patented Jan. 14, 1868.
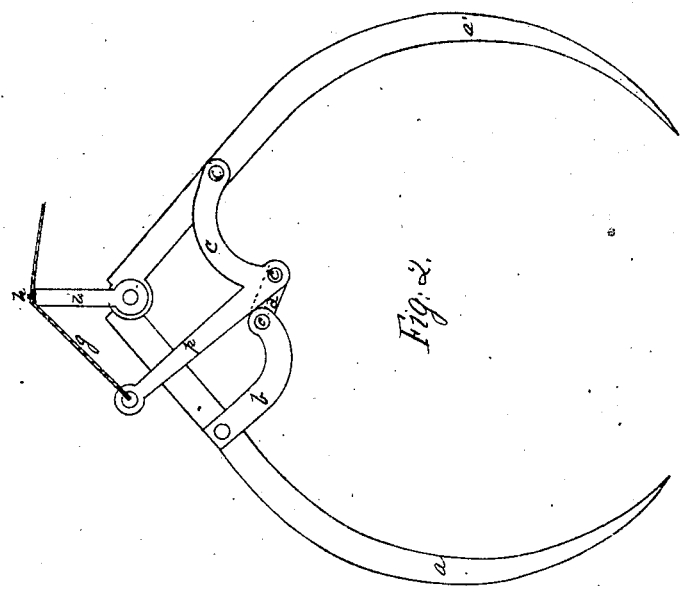
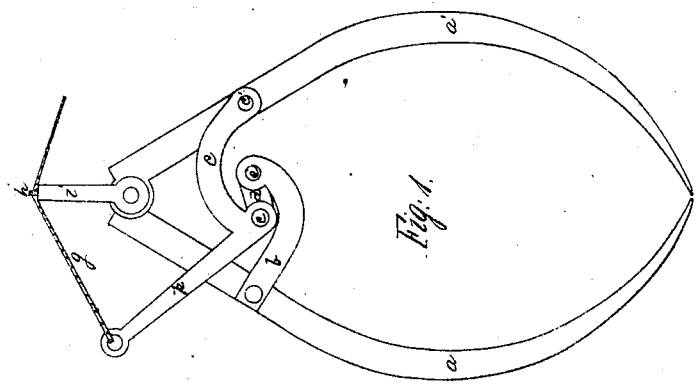
WITNESSES
W D Lewis
G. H. Cushing
Inventor
Isaac C Spear
by Bakewell & Christy
his Attys

United States Patent Office.

ISAAC C. SPEAR, OF NEW WILMINGTON, PENNSYLVANIA.

Letters Patent No. 73,403, dated January 14, 1868.

IMPROVEMENT IN HORSE HAY-FORKS.

The Schedule referred to in these Letters Patent and making part of the same.

TO ALL WHOM IT MAY CONCERN:

Be it known that I, ISAAC C. SPEAR, of New Wilmington, in the county of Lawrence, and State of Pennsylvania, have invented a new and useful Improvement in Hay-Elevators; and I do hereby declare the following to be a full, clear, and exact description thereof, reference being had to the accompanying drawing, making a part of this specification, in which—

Figure 1 is a side view of my improved hay-elevator, with its tines closed together, and Figure 2 is a similar view of the same, with the tines opened.

Like letters of reference indicate like parts in each.

The nature of my invention consists in the construction and arrangement of a pair of tines or bars, each hinged to the other at one end, each pointed at its opposite end, and both so curved that their points shall approach to or toward each other sufficiently near, and in such a way, that they shall, when locked together and hoisted, sustain and elevate hay, straw, or other loose material caught between them, in connection with a device of rigid and movable arms, united by a link-joint, for locking and unlocking the same.

To enable others skilled in the art to make and use my invention, I will proceed to describe its construction and mode of operation.

The tines or bars $a$ $a'$, I make of any desirable length or weight, usually of metal, and curved toward each other, point them at one end and hinge them together at the other, in such way that, in opening and closing, each will move nearly or exactly in the plane of its curvature. At any desirable distance from the hinged ends, I attach rigidly to one bar, $a$, an arm, $b$, and at nearly or about the corresponding point on the other bar, $a'$, I attach, by a pin or bolt, $c'$, a movable arm, $c$. These arms I usually make curved, and so attach them that their inner ends may, when the bars or tines $a$ $a'$ are closed together, swing past and lap each other, as shown in fig. 1. The ends of these arms are connected by a link-joint, $d$, the link being attached to the arms $b$ $c$ by rivets or pins $e$ $e'$. From the arm $c$, and rigidly attached thereto, extends the lever $f$, from which the rope or cord $g$ is passed through a ring or staple, $h$, on or forming a part of the chain by which the hay-elevator described is hoisted, with the load attached thereto, the ring or clevis $i$ being a connecting-link for such purpose.

To use the devices described, I open the tines $a$ $a'$, as shown in fig. 2, insert the points in the hay to be raised, force them in so far as may be practicable, and close them together, at the same time carrying the forward end of the arm $c$ over and past the end of the arm $b$. In order to secure a perfect lock, I press the lever $f$ well downwards, so as to make the centre of the pin $e$ come even with or below a line connecting the centres of the pins $c'$ and $e'$. Then all outward strain on the tines $a$ $a'$, caused by their load, will in no case loosen or tend to loosen the lock, but rather the reverse—the greater the load, the tighter the lock. The apparatus, then, with its load of hay, straw, or other material, is hoisted by a rope or chain attached to the clevis $i$, and usually, for convenience, passing over a pulley. The hay, &c., can then be swung to any desirable place, when a slight pull on the rope $g$ raises the centre of the pin $e$ above the line of outward strain, when the tines $a$ $a'$ at once fly open to the position shown in fig. 2, and the load is discharged. The same thing is then repeated till the work is done.

Instead of single bars or tines $a$ $a'$, double ones may be used successfully in connection with the locking-devices described. Other shapes than those shown in the drawings may be given to the arms $b$ $c$, provided the relationship of the centres of the points of hinging be preserved substantially as described.

The apparatus described is useful for elevating other articles than those named, as cotton-bales, large bundles or packages of merchandise, and other heavy articles of a similar character, and such and similar uses I include in my invention.

As advantages, I claim that my hay-elevator can be cheaply constructed, is durable, convenient for use, (particularly around and in barns, where projecting tines, handles, &c., are objectionable,) is light, and easily handled. With it remnants of a load of even loose hay, straw, &c., can easily be gathered up and elevated—a thing which many hay-elevators are poorly, if at all, adapted to perform.

What I claim as my invention, and desire to secure by Letters Patent, is—

In connection with the curved tines of a hay-elevator, a locking-device, consisting of arms $b$ $c$, link $d$, and detaching-lever $f$, or its mechanical equivalent, constructed and arranged substantially as and for the purposes hereinbefore set forth.

In testimony whereof, I, the said ISAAC C. SPEAR, have hereunto set my hand.

ISAAC C. SPEAR.

Witnesses:
A. S. NICHOLSON,
G. H. CHRISTY.